US012596941B2

(12) United States Patent
Vinov et al.

(10) Patent No.: US 12,596,941 B2
(45) Date of Patent: Apr. 7, 2026

(54) REALISTIC COUNTERFACTUAL EXPLANATION OF MACHINE LEARNING PREDICTIONS

(71) Applicant: International Business Machines Corporation, Armonk, NY (US)

(72) Inventors: Michael Vinov, Haifa (IL); Oleg Blinder, Haifa (IL); Diptikalyan Saha, Bangalore (IN); Sandeep Hans, New Delhi (IN); Aniya Aggarwal, New Delhi (IL); Omer Yehuda Boehm, Haifa (IL); Eyal Bin, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1172 days.

(21) Appl. No.: 17/378,794

(22) Filed: Jul. 19, 2021

(65) Prior Publication Data

US 2023/0025731 A1 Jan. 26, 2023

(51) Int. Cl.
| | |
|---|---|
| *G06N 5/045* | (2023.01) |
| *G06N 5/01* | (2023.01) |
| *G06N 20/00* | (2019.01) |

(52) U.S. Cl.
CPC ............. *G06N 5/045* (2013.01); *G06N 20/00* (2019.01)

(58) Field of Classification Search
CPC ................................ G06N 5/045; G06N 20/00
See application file for complete search history.

(56) References Cited

U.S. PATENT DOCUMENTS

| | | | | |
|---|---|---|---|---|
| 7,171,393 B2 * | 1/2007 | Naveh | ...................... | G06F 8/31 |
| | | | | 706/19 |
| 10,783,401 B1 * | 9/2020 | Jiang | ...................... | G06N 3/086 |
| 2005/0278702 A1 | 12/2005 | Koyfman | | |
| 2006/0184468 A1 | 8/2006 | Adir | | |
| 2016/0350155 A1 * | 12/2016 | Brutschy | .................. | G06F 8/74 |
| 2017/0255872 A1 | 9/2017 | Hamze | | |
| 2021/0133630 A1 * | 5/2021 | Dalli | ...................... | G06N 5/045 |

OTHER PUBLICATIONS

TrustyAI Explainability Toolkit Rob Geada, Tommaso Teofili, Rui Vieira, Rebecca Whitworth, Daniele Zonca Publisher :arXiv Cornell University (Year: 2021).*

(Continued)

*Primary Examiner* — Kamran Afshar
*Assistant Examiner* — Steven Phung
(74) *Attorney, Agent, or Firm* — Seed Intellectual Property Law Group LLP

(57) ABSTRACT

A computer-implemented method comprising, automatically: analyzing a machine learning dataset which comprises multiple datapoints, to deduce constraints on features of the datapoints; generating a first set of CSP (Constraint Satisfaction Problem) rules expressing the constraints; based on a machine learning model which was trained on the dataset, generating a second set of CSP rules that define one or more perturbation candidates among the features of one of the datapoints; formulating a CSP based on the first and second sets of CSP rules; solving the formulated CSP using a solver; and using the solution of the CSP as a counterfactual explanation of a prediction made by the machine learning model with respect to the one datapoint.

19 Claims, 2 Drawing Sheets

(56) References Cited

OTHER PUBLICATIONS

Alejandro Barredo-Arrieta et al, "Plausible Counterfactuals: Auditing Deep Learning Classifiers with Realistic Adversarial Examples"; Presentation at WCCI 2020; arXiv:2003.11323; Mar. 25, 2020.

Marco Tulio Ribeiro et al, "Anchors: High-Precision Model-Agnostic Explanations"; The Thirty-Second AAAI Conference on Artificial Intelligence (AAAI-18); pp. 1527-1535, Apr. 2018.

P. J. Hawkins et al, "Solving Set Constraint Satisfaction Problems using ROBDDs"; Journal of Artificial Intelligence Research, vol. 24, pp. 109-156; Sep. 2005.

Ramaravind Kommiya Mothilal et al., "Explaining Machine Learning Classifiers through Diverse Counterfactual Explanations"; Conference on Fairness, Accountability, and Transparency; arXiv:1905. 07697; May 19, 2019.

* cited by examiner

REALISTIC COUNTERFACTUAL EXPLANATION OF MACHINE LEARNING PREDICTIONS

BACKGROUND

The invention relates to the field of machine learning.

Machine learning is the study of computer algorithms which automatically improve through experience. It is often viewed as a subset of artificial intelligence (AI). Machine learning algorithms typically construct a mathematical model based on a collection of samples, also termed "training dataset," in order to infer predictions (or "decisions") without being specifically programmed to do so.

Explainability (also "interpretability") is an important factor in machine learning. Humans will tend to avoid trusting a prediction by a machine learning model, or refrain from using the model altogether, if there is no mechanism in place to explain how the model reached a certain decision. Customary performance metrics, such as accuracy, precision, recall, etc., are usually not enough to persuade a user that a particular machine learning model can be trusted. Users often seek assurances that the model they use is not unfairly biased towards certain demographics, does not expose sensitive information, does not base its decisions on non-causal associations, and does not drastically change its decision due to insignificant changes in input.

Accordingly, many mechanisms have been suggested for generating explanations of predictions made by machine learning models. One type of mechanisms, called "counterfactual explanation," is concerned with analyzing what could have happened had input to a model been changed in a particular way. More specifically, a counterfactual explanation to a certain, exemplary prediction can be expressed as the smallest change in input that will drive a significant change in the model's decision (often, a completely opposite decision). As a simplistic example, for a model trained to classify patients as suffering from a certain disease or not, a possible counterfactual explanation might be that a 5% increase in a certain blood test result in an exemplary datapoint would have been the threshold driving the model to classify the patient as suffering from the certain disease instead of as not suffering from it. A user can then decide, based on this and additional counterfactual explanations of the model's predictions, whether the model is sufficiently trustworthy and appropriate for use in the diagnosis of that disease.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a computer-implemented method comprising, automatically: analyzing a machine learning dataset which comprises multiple datapoints, to deduce constraints on features of the datapoints; generating a first set of CSP (Constraint Satisfaction Problem) rules expressing the constraints; based on a machine learning model which was trained on the dataset, generating a second set of CSP rules that define one or more perturbation candidates among the features of one of the datapoints; formulating a CSP based on the first and second sets of CSP rules; solving the formulated CSP using a solver; and using the solution of the CSP as a counterfactual explanation of a prediction made by the machine learning model with respect to the one datapoint.

Another embodiment provides a system comprising: (i) at least one hardware processor; and (ii) a non-transitory computer-readable storage medium having program code embodied therewith, the program code executable by said at least one hardware processor to, automatically: analyze a machine learning dataset which comprises multiple datapoints, to deduce constraints on features of the datapoints; generate a first set of CSP (Constraint Satisfaction Problem) rules expressing the constraints; based on a machine learning model which was trained on the dataset, generate a second set of CSP rules that define one or more perturbation candidates among the features of one of the datapoints; formulate a CSP based on the first and second sets of CSP rules; solve the formulated CSP using a solver; and use the solution of the CSP as a counterfactual explanation of a prediction made by the machine learning model with respect to the one datapoint.

A further embodiment provides a computer program product comprising a non-transitory computer-readable storage medium having program code embodied therewith, the program code executable by at least one hardware processor to, automatically: analyze a machine learning dataset which comprises multiple datapoints, to deduce constraints on features of the datapoints; generate a first set of CSP (Constraint Satisfaction Problem) rules expressing the constraints; based on a machine learning model which was trained on the dataset, generate a second set of CSP rules that define one or more perturbation candidates among the features of one of the datapoints; formulate a CSP based on the first and second sets of CSP rules; solve the formulated CSP using a solver; and use the solution of the CSP as a counterfactual explanation of a prediction made by the machine learning model with respect to the one datapoint.

In some embodiments, the analyzing of the machine learning dataset comprises analyzing values of the features of the datapoints.

In some embodiments, the analyzing of the values of the features is to discover descriptive statistics of the values across the dataset.

In some embodiments, the generating of the second set of CSP comprises, when a loss function of the machine learning model is accessible: (a) modifying the loss function of the machine learning model to use a flipped class label; (b) calculating gradients of the modified loss function with respect to the one datapoint; (c) translating the calculated gradients into a set of constraints, and formulating another CSP based on the set of constraints and on the first set of CSP rules; (d) solving the other CSP using the solver, to identify the one or more perturbation candidates among the features of the one datapoint; (e) generating a modified datapoint based on feature values of the perturbation candidates; (f) using the machine learning model to predict a class for the modified datapoint; and (g) iterating over steps b) through f) until a satisfactory opposite classification is achieved in step f), and then using the set of constraints of step c) as the second set of CSP rules, wherein, in each iteration, the modified datapoint of step e) of the previous iteration serves as the one datapoint of step b) of the current iteration.

In some embodiments, the generating of the second set of CSP comprises, when a loss function of the machine learning model is inaccessible: calculating an anchor for the one datapoint using the machine learning model, wherein the anchor is a definition of conditions that are a likely cause of a certain classification by the machine learning model; and translating the conditions in the second set of CSP rules.

In some embodiments, the one datapoint is randomly selected among all datapoints in the dataset.

In some embodiments of the method, it is executed by at least one hardware processor.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
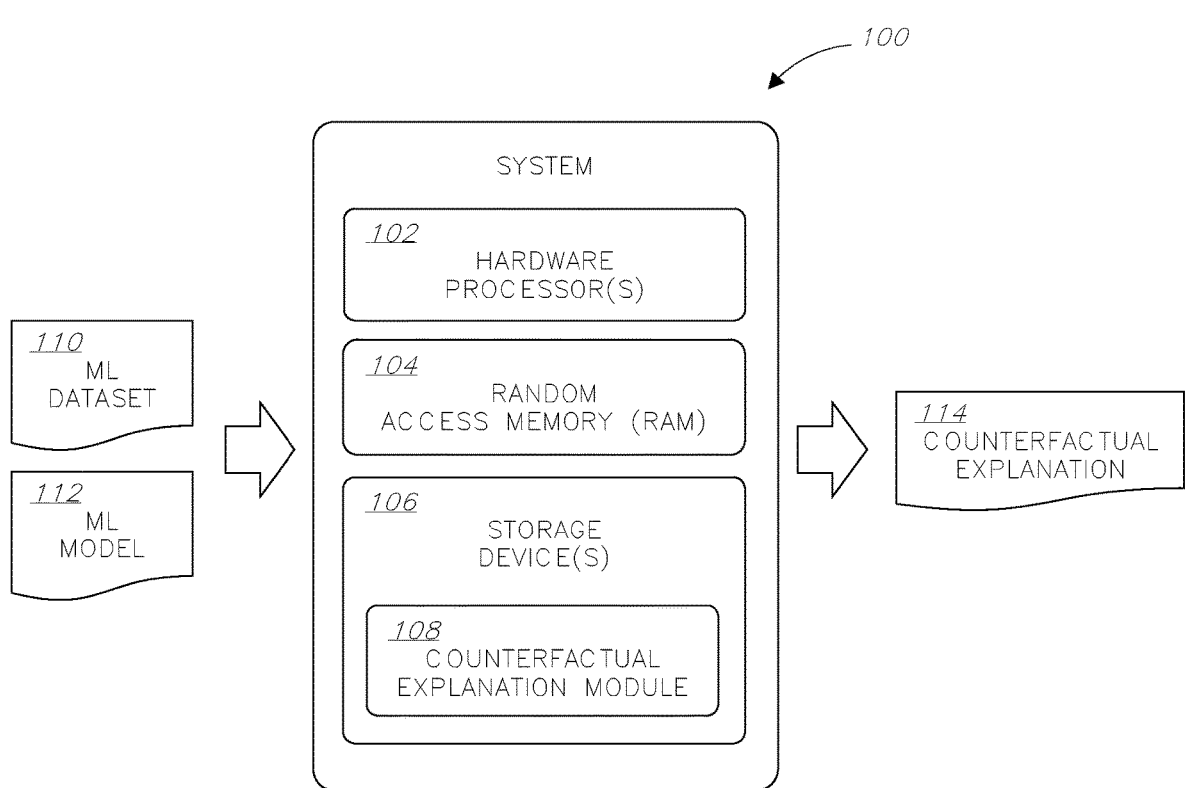
FIG. 1 is a block diagram of an exemplary system for generating realistic counterfactual explanations of a machine learning prediction, according to an embodiment.

Disclosed herein is a method, also embodied in a system and a computer program product, for generating counterfactual explanations of predictions made by a machine learning model (or "model" for short). Advantageously, the method aims to generate realistic counterfactual explanations, in the sense that they are both in line with general characteristics of the dataset, and do not recite invalid input values.

Use of the method may be preferred over certain previous approaches, in which naïve generation of counterfactual explanations may result in one or more of the following phenomena: First, unrealistic input values stated in the explanation, such as that a negative (below zero) age of a loan applicant will cause the machine learning model to approve the application rather than reject it. Second, invalid input values stated in the explanation, such as that reducing the loan applicant's age from 25 to 14 will cause the machine learning model to approve the application—when it is clear (especially when observing the training dataset) that it is not even possible for underaged teens to apply for a loan.

The method may be used with datasets which include structured or unstructured data. "Structured data" means textual and/or numerical data which is tabularly arranged (or arranged in any other similar, structured form), namely—the dataset is essentially a table in which each record (typically, a row) represents a datapoint (or a "sample"), and each column represents a feature of that record. "Unstructured" data, in turn, refers to a dataset in which datapoints and their features are not arranged as such; for example, image and video data provided as standard image/video files, or natural language datasets in which each datapoint is one or multiple words.

There is a special advantage, however, to using the method with structured data, because constraints on feature values are more prevalent in structured datasets. For example, in a structured dataset of biographic, medical, scientific, financial, or other tabular data, naïve perturbation of features is likely to sometimes result in unrealistic feature values, such as a person with a negative age, a medical test result which exceeds the possible range, a scientific measurement which is impossible, etc. In addition, structured datasets often exhibit certain relationships (e.g., causal structures, symmetric or asymmetric correlations, groupings, etc.) between different features, for example, a relationship between a patient's age and a certain blood test result range, or a relationship between a person's education and their income. Therefore, the generation of counterfactual explanations for machine learning predictions on structured data is far better when done intelligently, as with the present method.

When unstructured data is concerned, however, most scenarios can do well with naïve data perturbation, such as, for example, random changes to pixel colors in images or videos. Still, in some scenarios, there is still a benefit to using the present method with unstructured dataset, such as when the dataset involves certain important constraints on various values, or when there is significant correlation between features of the data.

The method may be based on the principle of expressing dataset constraints and perturbation candidate constraints as a joint CSP (Constraint Satisfaction Problem), and using a solver to solve that CSP. The solution to the CSP may then be used as a counterfactual explanation—the smallest perturbation to a certain datapoint that will result in a significant prediction shift.

The method may generally operate as follows:

First, a machine learning model and an associated machine learning dataset (namely, the dataset on which the model was trained) may be received or otherwise accessed.

The dataset may be analyzed, to deduce what constraints on features of the dataset are apparent from the values of these features (such as from statistical metrics of these values).

A set of CSP rules expressing the deduced constraints may then be generated.

Further, a second set of CSP rules may be generated, this time based on the machine learning model itself: depending on whether the internals of the model are accessible or not, different steps may be carried out to define one or more perturbation candidates among the features of one of the datapoints of the dataset.

These two sets of CSP rules express, essentially, what perturbations of a certain datapoint are realistic—in view of both the characteristics of the dataset, and the behavior of the model.

The two sets of CSP rules are then used to formulate a joint CSP. The solution to the CSP, rendered by a solver, is essentially the counterfactual explanation of a prediction made by the model with respect to the one datapoint.

The method may be repeated for any number of different, randomly-selected datapoints, to provide the user with a greater number of counterfactual explanations.

Reference is now made to FIG. 1, which shows a block diagram of an exemplary system 100 for generating realistic counterfactual explanations of a machine learning prediction, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a counterfactual explanation module 108. The software components may include an operating system having various software components and/or drivers for controlling and managing general system tasks (e.g., memory management, storage device control, power management, etc.), and facilitating communication between various hardware and software components.

System 100 may operate by loading instructions of counterfactual explanation module 108 into RAM 104 as they are being executed by processor(s) 102. The instructions of counterfactual explanation module 108 may cause system 100 to receive (or otherwise access) a machine learning dataset 110 and a machine learning model 112, process them, and output a counterfactual explanation 114.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art.

Figure 2:
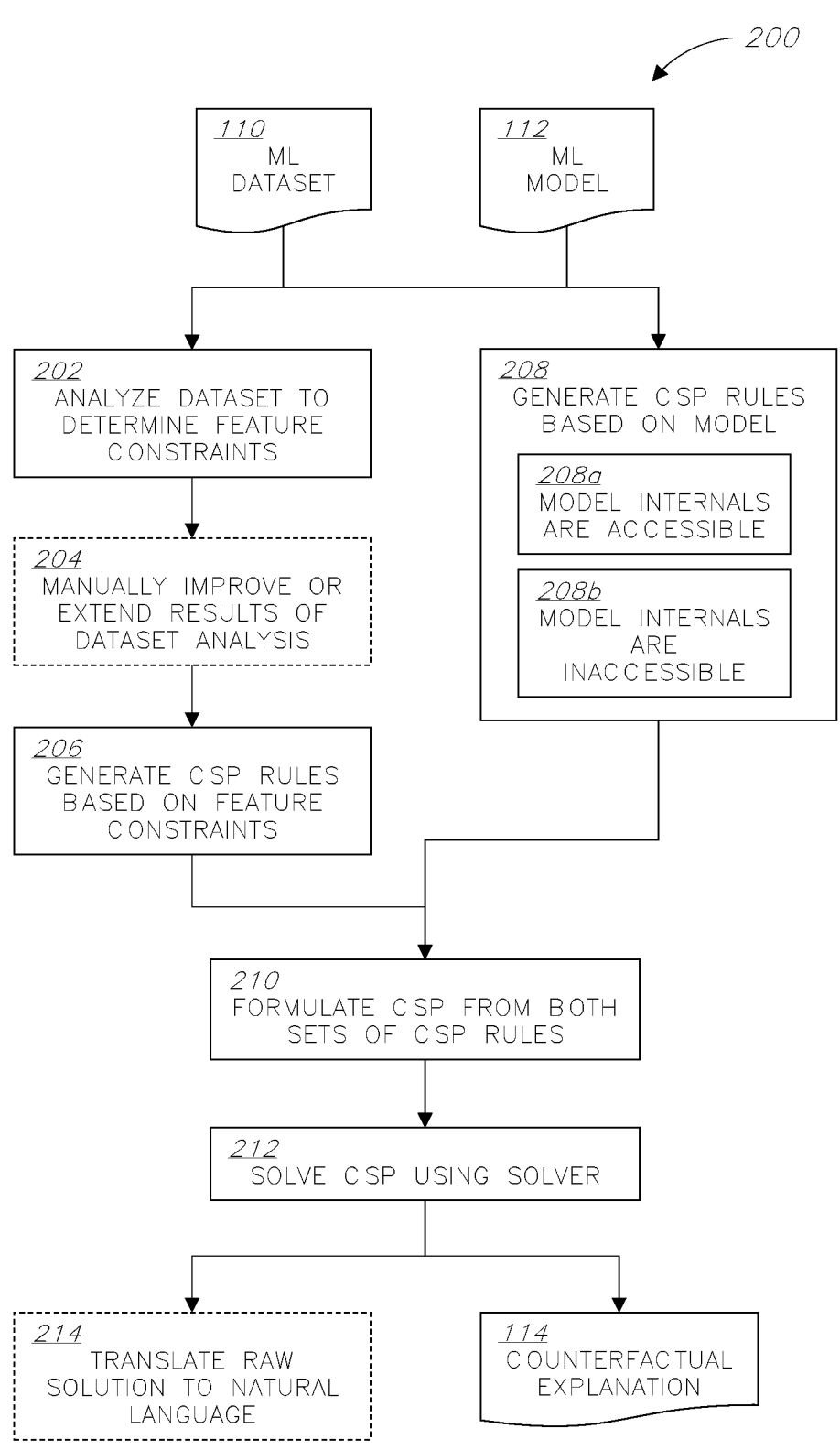
FIG. 2 is a flowchart of a method for generating realistic counterfactual explanations of a machine learning prediction, according to an embodiment.

The instructions of counterfactual explanation module 108 are now discussed with reference to the flowchart of FIG. 2, which illustrates a method 200 for generating realistic counterfactual explanations of a machine learning prediction, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

The description of method 200 is presented alongside an example of a structured dataset that is often used for research purposes, the 'Census Income' dataset, provided by the Center for Machine Learning and Intelligent Systems, Bren School of Information and Computer Science, University of California, Irvine, available online at archive.ics.uci.edu/ml/datasets/adult. This dataset is aimed at allowing machine learning researchers to experiment with predicting whether a person's income exceeds $50,000 per year, based on census data of 32,561 people. The dataset includes, for each datapoint (a row, representing one person), features (columns) such as age, work type (e.g., private, government, self-employed, etc.), education level, marital status, occupation, gender, work hours per week, native country, and more. Each datapoint has a ground truth label of '<=50K' or '>50K'.

Initially, in method 200, a machine learning dataset 110 and a machine learning model 112 are received, or are otherwise accessed by the computing device carrying out method 200. Dataset 110 and model 112 are associated, in the sense that the model was trained on the dataset.

Dataset 110 may include multiple (e.g., at least dozens, hundreds, thousands, or more) datapoints (also "samples") belonging to a certain modality; for example, these may be texts (including numerical values), images, videos, audio segments, or the like. In the exemplary Census Income dataset, the datapoints include textual as well as numerical data.

Model 112 may be any suitable machine learning model that is configured to make a prediction based on an input datapoint, namely—to map the input to a certain output based on the model's learned association between input-output pairs in a training stage. One example of such model is a machine learning classifier, which classifies input into one or more different classes (groups). In the Census Income example, the model may be trained to predict (estimate), based on multiple feature values of a certain person, whether that person earns more than $50,000 a year, or less than (or exactly) $50,000 a year.

In a step 202, dataset 110 may be analyzed, to determine general characteristics, statistical or otherwise, of the dataset. More specifically, the analysis may be aimed at deducing what constraints on features of the dataset are apparent from the values of these features in the actual dataset.

The term "features," as referred to herein, may relate to those individual, measurable properties (or "characteristics") of a datapoint. For example, in a computer vision model, features of a datapoint (image) may include various edges, ridges, blobs, etc. In a speech recognition model aimed at recognizing phonemes, features may include noise ratios, length of sounds, relative power, etc. In spam (junk email) detection models, features may include the presence or absence of certain email headers, the language, the frequency of specific terms, the grammatical correctness of the text, etc. In a business data analysis model, such as a classification model for the Census Income dataset, features may include a person's age, income, marital status, etc. Typically, the value of each feature is given as a number, but in certain special cases may be provided as a string (of characters, symbols, and/or numbers). The collection of all feature values of a datapoint is often referred to as a "feature vector."

The analysis of step 202 may employ automatic techniques that discover descriptive statistics of the features across dataset 110, such as distribution of feature values, maximal and minimal feature values, association between and grouping of features, etc.

For example, in the Census Income dataset, such analysis may determine that the 'age' and 'marital status' features are associated, that the 'education' and 'work type' features are associated, that 'work hours per week' are normally distributed, that 'age' is between 17 and 90, etc.

Optionally, method 200 does not rely on any manually-provided information as to feature constraints of dataset 110, but rather determines these on its own, automatically, by the analysis of step 202.

Alternatively, in an optional step 204, the results of the automated analysis of the previous step may be manually improved and/or extended, if so desired by a user of method 200. For example, the user may manually define an association between different features, a maximum/minimum permitted value of one or more features, and/or the like. Considerations for including such extended definitions may vary by domain.

In a step 206, the feature constraints determined in step 202, and optionally their extension resulting from step 204, may be expressed in a set of generated CSP rules. Namely, the constraints on the values (or their statistics) of the features in dataset 110 may be translated to formal CSP format ("language").

In a step 208, a second set of CSP rules may be generated, this time based on model 112. These CSP rules may define one or more perturbation candidates among the features of one of the datapoints, as well as the extent (amount, magnitude) of perturbation.

There are two manners of executing step 208, depending on whether the internals of model 112 are accessible or not. Access to the internals of model 112, namely—at least to its loss function—may allow for more accurate execution of step 208. Still, this step also allows for working with "black box" models—those which are provided as simple executables whose internal construct, and especially loss function, is known.

In a sub-step 208a, executed when the internals of model 112 are accessible, the following actions may take place: A target class label may be selected by a user (or, if method is so configured, a target class label may be selected automatically, at random).

Then, the method may automatically select, at random, one datapoint from dataset 110 which belongs to the previously-selected class. For instance, if dataset 110 is the exemplary Census Income dataset, a selection of a '>50K' class label (out of the '>50K' and '<=50K' labels) will cause the method to randomly select one of the '>50K'-labeled datapoints from dataset 110 (but, as an alternative to automatic selection of a datapoint, the method may enable the user to manually select one datapoint which is of interest to him or her); this, in turn, will result in a counterfactual explanation of the minimal change(s) to that datapoint which will drive model 112 to change its class prediction from '>50K' to '<=50K'.

As an example, let us assume that the following datapoint from the Census Income dataset has been selected:

TABLE 1

| | | | | Selected datapoint from the Census Income dataset | | | |
|---|---|---|---|---|---|---|---|
| Age | Work type | Education level | Marital status | Occupation | Gender | Work hours per week | Native Country |
| 44 | Private | Some college | Married | Machine operator | Male | 40 | United States |

Note that each textual feature value may be provided, additionally or alternatively, as a numerical value in an interval representing the range of textual value. For example, different levels of education may be represented as numbers between 1 and 16.

Let us assume that this exemplary datapoint, when classified by model 112, is predicted to have a '>50K' label. Numerically, model 112 may express that label as '0.787' which means, since this is a binary classification problem, that a value above 0.5 (merely as an example) is '>50K' and a value of 0.5 or less is '<=50K'. The '>50K' labels indeed happens to be the ground truth label of that datapoint, as provided in the Census Income dataset.

Next, the following actions may be performed, some of them iteratively, until the classification of the selected datapoint is changed (e.g., from '>50K' to '<=50K', namely—reaches 0.5 or below):

First, the datapoint's class label may be flipped (e.g., from '>50K' to '<=50K').

Second, the loss function of model 112 may be modified to use the flipped label, namely—to use (and minimize/ maximize, as the case may be) the mean squared error or the binary cross-entropy between the model's prediction and the flipped class label.

Third, the gradients of the modified loss function may be calculated with respect to the selected datapoint. For example:

TABLE 2

| | | | | Calculated gradients for the selected datapoint from the Census Income dataset | | | |
|---|---|---|---|---|---|---|---|
| Age | Work type | Education level | Marital status | Occupation | Gender | Work hours per week | Native Country |
| −0.037 | −0.134 | −0.181 | −0.676 | −0.016 | 0.607 | 0.674 | 0.462 |

Notably, the gradients provide both direction (positive/negative) and magnitude (numerical value). For example, a negative change (−0.676) in marital status (e.g., being unmarried as opposed to married) will have the greatest impact on the error calculated by the modified loss function, followed by a positive change (+0.674) in the hours worked per week, and so on. Conversely, increasing the age feature value (−0.0037 gradient) will only have a small impact on the error.

Fourth, the calculated gradients may be translated into a set of candidate model constraints that propose changes to feature values in view of these gradients. For example, the set of constraints may propose decreasing education by a certain amount, slightly increasing age, leaving the occupation intact, switching gender from female to male, etc.

Fifth, the candidate model constraints, together with the set of CSP rules generated in step 206 for the dataset features, may be combined into and expressed as a CSP.

Sixth, this CSP may be provided to a solver, which outputs an optimal solution satisfying all constraints. An exemplary solution may be:

TABLE 3

| | Exemplary solver solution | |
|---|---|---|
| Feature | Original | Solution (Change to . . .) |
| Age | 44 | 44.258 |
| Education | 10 | 8.726 |
| Gender | Male | Female |
| Work hours per week | 40 | 37.133 |

As shown in Table 3, the solution provides that age, education, gender, and work hours per week are all features that are good perturbation candidates. The solution further provides by how much each of these candidates should be perturbed.

Seventh, a modified (perturbed) datapoint may be generated from the feature values in the solver's solution (namely, having the values in the solution).

Eighth, model 112 may be used to predict a class for the modified datapoint. Let us assume, for example, that model 112 predicts a value of 0.657, which still means '>50K' but is certainly lower than the value which was calculated for the unmodified datapoint, 0.787, and closer to the 0.5 threshold between the classes. This means that the perturbation provided by the above eight-step process is in the right direction, and brings the datapoint closer to being oppositely-classified. Accordingly, the third through the eighth steps may be repeated, each time with a slightly-perturbed datapoint serving as the 'selected' datapoint, until model 112 predicts the opposite class at a satisfactory confidence level (e.g., a class value of 0.4, 0.3, 0.2 or less). Namely, every time after the eighth step yields a classification which is not yet satisfactory, another iteration may be executed, by:

Third step: Calculating gradients of the modified loss function with respect to the slightly-perturbed datapoint of the eighth step of the previous iteration;

Fourth step: Translating the calculated gradients into a set of candidate model constraints that propose changes to feature values in view of these gradients;

Fifth step: Combining the candidate model constraints with the set of CSP rules generated in step 206 for the dataset features, into a CSP;

Sixth step: Providing this CSP to a solver, which outputs an optimal solution satisfying all constraints;

Seventh step: Generating a modified (perturbed) datapoint from the feature values in the solver's solution; and Eighth step: Use model 112 to predict a class for the modified datapoint of the previous step.

When, in a certain iteration, a satisfactory opposite classification is achieved in the eighth step, the CSP rules of the fifth step of that iteration can be used as the second set of CSP rules (the set which is based on model 112). This second set of CSP rules is the output of sub-step 208a.

In a sub-step 208b, executed when the internals of model 112 are inaccessible, the following actions may take place: A target class and a datapoint from dataset 110 may be selected, similar to what has been discussed above with reference to sub-step 208a.

Then, the 'Anchors' technique of Ribeiro et al. (Ribeiro, M. T., Singh, S., and Guestrin, C., "Anchors: High-Precision Model-Agnostic Explanations," Proceedings of the AAAI Conference on Artificial Intelligence, 32(1), April 2018) may be employed to calculate an 'anchor' for the selected datapoint, given that model 112 is a black box with inaccessible internals.

This anchor is essentially a definition of conditions (discrete feature values or ranges of values) that are the likely cause of the certain classification. For example, as shown in Table 3 of Ribeiro et al., which is based on the Census Income dataset, there are three feature values/ranges that strongly affect classification as '>50K': native country is 'United States', marital status is 'married', and work hours per week is >45.

The feature values/ranges contained in the calculated anchor may serve as a basis for deciding what features in the selected datapoint to perturbate, and by how much. Accordingly, in sub-step 208b, these feature values/ranges may be translated into CSP rules that express the anchor, which serve as the second set of CSP rules.

In the figure, steps 202-206 and step 208 are drawn in parallel, simply because there is no dependency between them. However, it is certainly possible to carry them out sequentially rather than in parallel.

In a step 210, a CSP may be formulated from the first and second sets of CSP rules, jointly.

In a step 212, the formulated CSP may be solved using a conventional solver. A solver, as known in the art, is a computer program used for solving optimization problems; it is typically configured to minimize or maximize a certain mathematical function given certain constraints.

The solution to the CSP may essentially be the counterfactual explanation 114, namely—the smallest perturbation to one or more of the features of the arbitrary datapoint that will result in a significant prediction shift, such as a change in classification from one class to another.

In an optional step 214, the raw solution given by the solver in step 212, which is typically a mathematical representation, may be translated into a textual solution that can be more readily understood by the user as a counterfactual explanation. As a simplistic example, if the raw solution includes a value of "5%" for feature number 15, in datapoint number 100, for class 1, its translation may be to the following sentence: "a 5% increase in the ratio of whisker length to nose size in image no. 100 would have caused the model to classify the object in the image as a cat." In this sentence, "5%" is the extent of perturbation, "ratio of whisker length to nose size" is the name of feature number 15 in the feature vector, and "cat" is class no. 1. Of course, this is just one example of how numerical/mathematical results of the CSP may be translated into natural language for better human comprehension.

With reference to the Census Income example, the textual solution may be that, to achieve a classification result of 0.3 (which reverses the classification, significantly, from '>50K' to '<=50K'), a person's age needs to be 42 or lower, their education needs to be (numerically) 12 or less, and their marital status must correspond (numerically) to less than 'married' (e.g., to 'never married'). An alternative phrasing of such textual solution, which refers directly to the selected datapoint, may be that "to be classified as '>50K', the person of the selected datapoint needs to be at least 2 years older, and must work 5 more hours per week." These are the smallest changes to the particular datapoint that would drive a change of classification. Note this textual solution is merely given as an arbitrary example, and does not correspond directly to the perturbations discussed above with reference to sub-steps 208a and 208b.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:

automatically analyzing a machine learning dataset comprising at least one datapoint to deduce constraints on features of the at least one datapoint;

generating a first set of CSP (Constraint Satisfaction Problem) rules expressing the constraints;

based on a machine learning model trained on the machine learning dataset, generating a second set of CSP rules that define one or more perturbation candidates among the features of the at least one datapoint, wherein the perturbation candidates are one or more changes to features associated with the at least one datapoint, comprising:

generating a modified datapoint based on changed feature values associated with the perturbation candidates and the at least one datapoint;

formulating a CSP based on the first and second sets of CSP rules;

solving the formulated CSP using a solver;

using the solution of the CSP as a counterfactual explanation of a prediction made by the machine learning model with respect to the at least one datapoint, wherein the counterfactual explanation is a natural language representation of the solution of the CSP; and responsive to an accessible loss function of the machine learning model, iterating until an opposite classification is achieved, and subsequently using a set of constraints as the second set of CSP rules, wherein, in each iteration, the modified datapoint of a previous iteration serves as the at least one datapoint of a current iteration.

2. The computer-implemented method of claim 1, wherein the analyzing of the machine learning dataset comprises analyzing values of the features of the at least one datapoint.

3. The computer-implemented method of claim 2, wherein the analyzing of the values of the features is to discover descriptive statistics of the values across the machine learning dataset.

4. The computer-implemented method of claim 1, wherein the current iteration comprises:

modifying the loss function of the machine learning model to use a flipped class label;

calculating gradients of the modified loss function with respect to the at least one datapoint;

translating the calculated gradients into the set of constraints, and formulating another CSP based on the set of constraints and on the first set of CSP rules;

solving the other CSP using the solver, to identify the one or more perturbation candidates among the features of the at least one datapoint;

using the machine learning model to predict a class for the modified datapoint.

5. The computer-implemented method of claim 1, wherein the generating of the second set of CSP comprises, when a loss function of the machine learning model is inaccessible:

calculating an anchor for the at least one datapoint using the machine learning model, wherein the anchor is a definition of conditions that are a likely cause of a certain classification by the machine learning model; and translating the conditions in the second set of CSP rules.

6. The computer-implemented method of claim 1, wherein the at least one datapoint is randomly selected among all datapoints in the machine learning dataset.

7. The computer-implemented method of claim 1, executed by at least one hardware processor.

8. A system comprising:

(i) at least one hardware processor; and (ii) a non-transitory computer-readable storage medium having program code embodied therewith, the program code executable by said at least one hardware processor to:

automatically analyze a machine learning dataset comprising at least one datapoint to deduce constraints on features of the at least one datapoint;

generate a first set of CSP (Constraint Satisfaction Problem) rules expressing the constraints;

based on a machine learning model trained on the machine learning dataset, generate a second set of CSP rules that define one or more perturbation candidates among the features at least one datapoint in the one or more datapoints, wherein the perturbation candidates are one or more changes to features associated with the at least one datapoint, comprising:

generating a modified datapoint based on changed feature values associated with the perturbation candidates and the at least one datapoint;

formulate a CSP based on the first and second sets of CSP rules;

solve the formulated CSP using a solver;

use the solution of the CSP as a counterfactual explanation of a prediction made by the machine learning model with respect to the at least one datapoint, wherein the counterfactual explanation is a natural language representation of the solution of the CSP; and responsive to an accessible loss function of the machine learning model, iterate until an opposite classification is achieved, and subsequently using a set of constraints as the second set of CSP rules, wherein, in each iteration, the modified datapoint of a previous iteration serves as the at least one datapoint of a current iteration.

9. The system of claim 8, wherein the analyzing of the machine learning dataset comprises analyzing values of the features of the at least one datapoint.

10. The system of claim 9, wherein the analyzing of the values of the features is to discover descriptive statistics of the values across the machine learning dataset.

11. The system of claim 8, wherein the current iteration comprises:

modifying the loss function of the machine learning model to use a flipped class label;

calculating gradients of the modified loss function with respect to the at least one datapoint;

translating the calculated gradients into the set of constraints, and formulating another CSP based on the set of constraints and on the first set of CSP rules;

solving the other CSP using the solver, to identify the one or more perturbation candidates among the features of the at least one datapoint;

using the machine learning model to predict a class for the modified datapoint.

12. The system of claim 8, wherein the generating of the second set of CSP comprises, when a loss function of the machine learning model is inaccessible:

calculating an anchor for the at least one datapoint using the machine learning model, wherein the anchor is a definition of conditions that are a likely cause of a certain classification by the machine learning model; and translating the conditions in the second set of CSP rules.

13. The system of claim 8, wherein the at least one datapoint is randomly selected among all datapoints in the dataset.

14. A computer program product comprising a non-transitory computer-readable storage medium having program code embodied therewith, the program code executable by at least one hardware processor to:

automatically analyze a machine learning dataset comprising at least one datapoints to deduce constraints on features of the at least one datapoint;

generate a first set of CSP (Constraint Satisfaction Problem) rules expressing the constraints;

based on a machine learning model trained on the machine learning dataset, generate a second set of CSP rules that define one or more perturbation candidates among the features at least one datapoint, wherein the perturbation candidates are one or more changes to features associated with the at least one datapoint, comprising:

generating a modified datapoint based on changed feature values associated with the perturbation candidates and the at least one datapoint;

formulate a CSP based on the first and second sets of CSP rules; solve the formulated CSP using a solver;

use the solution of the CSP as a counterfactual explanation of a prediction made by the machine learning model with respect to the at least one datapoint, wherein the counterfactual explanation is a natural language representation of the solution of the CSP; and responsive to an accessible loss function of the machine learning model, iterate until an opposite classification is achieved, and subsequently using a set of constraints as the second set of CSP rules, wherein, in each iteration, the modified datapoint of a previous iteration serves as the at least one datapoint of a current iteration.

15. The computer program product of claim 14, wherein the analyzing of the machine learning dataset comprises analyzing values of the features of the at least one datapoint.

16. The computer program product of claim 15, wherein the analyzing of the values of the features is to discover descriptive statistics of the values across the machine learning dataset.

17. The computer program product of claim 14, wherein current iteration comprises:

modifying the loss function of the machine learning model to use a flipped class label;

calculating gradients of the modified loss function with respect to the at least one datapoint;

translating the calculated gradients into the set of constraints, and formulating another CSP based on the set of constraints and on the first set of CSP rules;

solving the other CSP using the solver, to identify the one or more perturbation candidates among the features of the at least one datapoint;

using the machine learning model to predict a class for the modified datapoint.

18. The computer program product of claim 14, wherein the generating of the second set of CSP comprises, when a loss function of the machine learning model is inaccessible:

calculating an anchor for the at least one datapoint using the machine learning model, wherein the anchor is a definition of conditions that are a likely cause of a certain classification by the machine learning model; and translating the conditions in the second set of CSP rules.

19. The computer program product of claim 14, wherein the one datapoint is randomly selected among all datapoints in the machine learning dataset.

* * * * *